United States Patent [19]
Senoski

[11] 3,888,178
[45] June 10, 1975

[54] MODEL ROCKET-GLIDER

[76] Inventor: Walter E. Senoski, 1720 Elderslee Rd., Pittsburgh, Pa. 15227

[22] Filed: Oct. 30, 1974

[21] Appl. No.: 519,192

[52] U.S. Cl. .................. 102/34.1; 46/74 A; 46/81; 244/13
[51] Int. Cl. ..................... F42b 15/16; A63h 27/06
[58] Field of Search .......... 244/13, 87, 74; 46/74 R, 46/74 A, 74 B, 74 C, 76, 81; 102/34, 34.1, 102/34.4

[56] References Cited
UNITED STATES PATENTS
| | | | |
|---|---|---|---|
| 3,157,960 | 11/1964 | Schultz et al.................. | 46/74 B X |
| 3,844,557 | 10/1974 | Pompetti....................... | 102/34.1 X |

FOREIGN PATENTS OR APPLICATIONS
| | | | |
|---|---|---|---|
| 1,003,512 | 3/1952 | France................................ | 46/81 |

Primary Examiner—Trygve M. Blix
Assistant Examiner—Galen Barefoot
Attorney, Agent, or Firm—Parmelee, Miller, Welsh & Kratz

[57] ABSTRACT

A solid fuel-powered model rocket having a main body tube and at least one auxiliary body tube. A solid fuel motor is mounted in the after end of one of the tubes and a slidable plug is disposed in the after end of the other tube, the plug being provided with a latch for engaging a wing elevator and maintaining it parallel to the horizontal plane of the wing against the biasing of a resilient band while the craft is in vertical flight. Following burn-out of the propellant charge, the gases generated upon ignition of a blow-out charge in the fuel cartridge cause rearward displacement of the slidable plug, disengagement of the latch and deployment of the elevator to a predetermined up-angel relative to the top horizontal plane of the wing, thereby directing the craft into a generally horizontal glide attitude.

12 Claims, 5 Drawing Figures

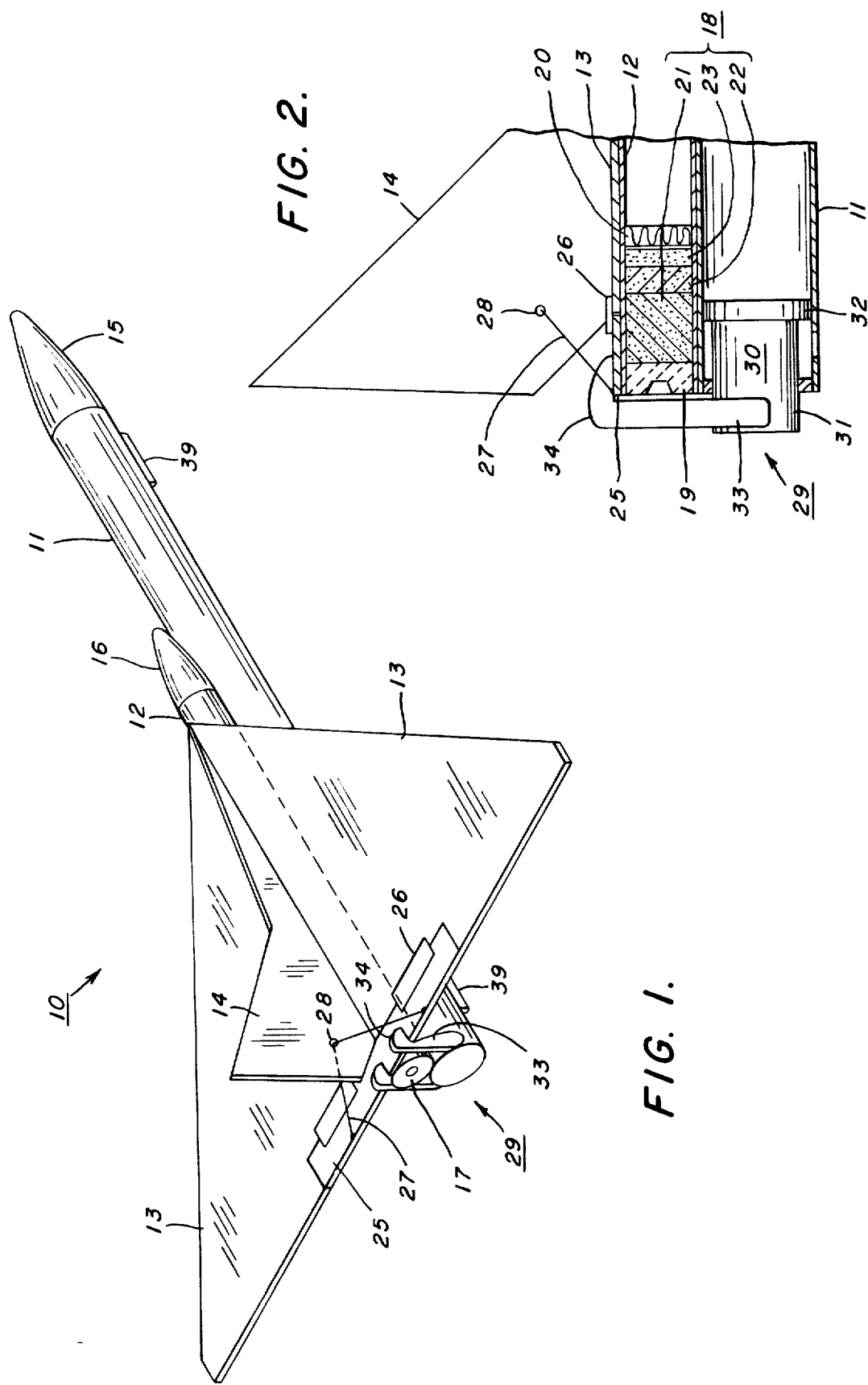

MODEL ROCKET-GLIDER

BACKGROUND OF THE INVENTION

The advent of the space age has engendered a great deal of interest in model rocketry. Model rockets, powered by solid fuel propellant can easily reach heights of several hundreds of feet. As most model rockets are designed for repeated use, recovery means are generally provided to insure a soft landing after the rocket has spent its fuel and attained its maximum altitude, said recovery means usually consisting of a streamer or a parachute. A more sophisticated recovery means comprising a foldable rotor assembly is disclosed in my copending U.S. patent application Ser. No. 378,595, filed July 12, 1973.

As an alternative to said recovery means, it is desirable to provide a rocket capable of gliding back to earth after it has attained its maximum altitude. However, this cannot be effected simply by enlarging the rocket's fins so as to increase the airfoil surface as might be expected, as model rockets are balanced for only vertical flight, and to achieve a glider effect it is necessary to provide means of altering the balance of the assembly as well as the airfoil configuration during flight in order that a proper horizontal glide attitude will result.

One such means is disclosed in my copending U.S. patent application Ser. No. 469,438, filed May 13, 1974, wherein the nose cone of the model rocket is ejected and replaced by a second nose cone contained within the rocket body after the rocket has expended its fuel. Concurrently with the replacement of the ejected nose cone by the second nose cone, a wing elevator is actuated and the assembly glides back to earth. One disadvantage inherent in said construction is that means should be provided to recover the ejected nose cone, such as a streamer or parachute or the like. Moreover, in even moderate winds the ejected nose cone may be carried far from the launch point, thus increasing the risk of losing the same.

OBJECT OF THE INVENTION

It is, therefore, the principal object of this invention to provide a model rocket which is capable of performing as a glider after the rocket has spent its fuel and completed vertical flight, said conversion from a rocket to glider being effected without the need for ejecting any component parts free from the assembly.

BRIEF DESCRIPTION OF THE INVENTION

The present invention comprises a solid fuel-powered model rocket having a main body tube and at least one auxiliary body tube. A solid fuel motor is mounted in the after end of one of said tubes and a slidable plug is disposed in the after end of the other tube, said plug being provided with means for engaging a wing elevator and maintaining the same parallel to the horizontal plane of the wing against a resilient biasing means while the craft is in vertical flight. Following burn-out of the propellant charge, the gases generated upon ignition of a blow-out charge in the fuel cartridge cause rearward displacement of the slidable plug, disengagement of the elevator retaining means and deployment of the elevator to a predetermined up-angle relative to the top horizontal plane of the wing, thereby directing the craft into a generally horizontal glide attitude.

DESCRIPTION OF THE DRAWINGS

FIG. 1 is a rear perspective view of a model rocket-glider embodying the invention;

FIG. 2 is an enlarged side sectional view of the after portion of the rocket-glider of FIG. 1 showing the elevator actuating assembly with the wing elevator positioned for vertical take-off and vertical flight;

DETAILED DESCRIPTION OF THE INVENTION

Figure 3:
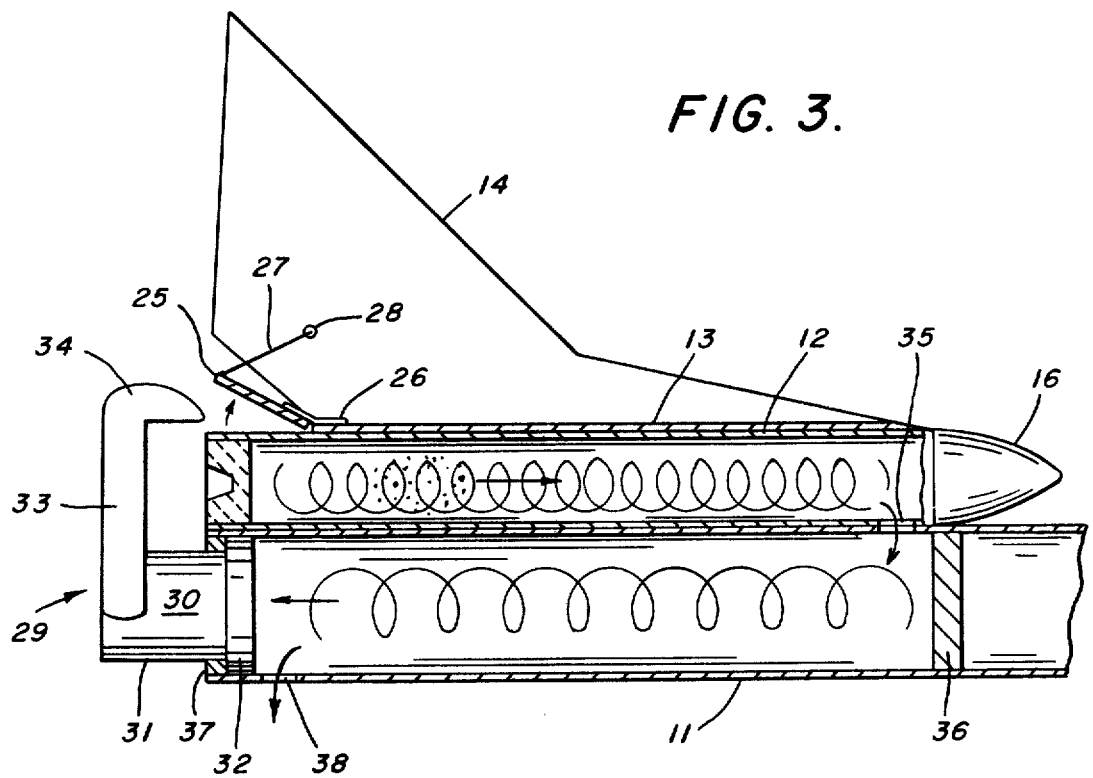
FIG. 3 is an enlarged side sectional view of the elevator actuating assembly with the wing elevator positioned for horizontal glide, showing the means by which the elevator is actuated.

In FIG. 1, 10 generally indicates a model rocket-glider having a main body tube 11, an auxiliary tube 12 secured to the main tube 11 and parallel to the longitudinal axis thereof, wings 13 and a stabilizing fin 14. In the forward ends of each of tubes 11 and 12 are fixedly mounted nose cones 15 and 16 having a suitable streamlined configuration. It is to be understood that the provision of said nose cones is optional as the tubes could just as well be closed at their forward ends. The nose cones serve to minimize air resistance during flight and also provide a more aesthetically pleasing and more realistic appearance to the model. A commercially available solid fuel motor 17 is mounted in the after end of auxiliary tube 12. As shown in FIG. 2, the motor 17 generally comprises an explosive charge 18 compressed against a ring 19 of refractory material. The forward end of the motor is closed by a cap 20. The explosive charge 18 is made of an explosive composition, such as black powder or the like, compounded with other materials as is well-known in the art so as to burn at the desired rate. The explosive charge 18 is usually formed in three sections, i.e., a first propellant charge 21 of compressed powder having a high burning rate; a second propellant charge 22 of slower burning powder; and a third or blow-out charge 23. The first charge 21 provides the initial or lift-off thrust to the rocket, the second charge 22 boosts the rocket to maximum altitude and the third or blow-out charge 23 provides the energy to disengage an elevator retaining means 29 after the propellant charges 21 and 22 have been exhausted and the rocket has reached its apogee, in a manner which will be described hereinafter.

It is to be realized that the dimensions of the body tubes 11 and 12, the dimensions of the wings 13 and stabilizing fin 14, as well as the size and performance characteristics of the motor 17 are selected in a manner well-known to the art to assure that the assembly will have the proper balance and aerodynamic characteristics during both vertical flight and horizontal glide.

An elevator 25 is provided in the trailing edge of wings 13. The elevator 25 is secured to the wings by hinges 26, whereby the elevator may be angularly disposed to the horizontal plane of the wings. The hinges 26 are preferably made of a resilient material, such as cloth, tape or the like, and are secured to the elevator and wings by adhesive means. Resilient means 27 are used to bias the elevator at a predetermined upward angle relative to the top horizontal plane of the wings during glider descent. In the embodiment shown, an elastic band or the like is passed through an aperture 28 in the vertical fin 14 and each end of the elastic band is secured to the elevator 25. It is, of course, to be realized that other biasing means, such as small springs or the like, may also be used.

For vertical flight, the elevator 25 must be maintained parallel to the horizontal plane of the wings 13 and means 29 are provided for maintaining this configuration. As shown in detail in FIG. 2, the elevator restraining means 29 comprises a plug 30 slidably disposed in the after end of main tube 11. The plug 30 comprises a cylindrical body portion 31, the forward end of which is formed as an outwardly directed radial flange 32. The diameter of the flanged portion 32 is such as to frictionally engage the inner wall of tube 11 and assure a snug fit therein, but the fit should not be so snug as to prevent rearward displacement of the plug 30 within the tube 11 under the urging of the gases generated on ignition of the blow-out charge 23 of motor 17.

The after end of plug 30 protrudes from the after end of tube 11 and has affixed thereto, and extending upwardly therefrom, a pair of parallel, spaced planar members 33. The upper ends of each of said members 33 terminates in a forwardly directed arm 34, the under end of each of said arms 34 impinging on the top surface of elevator 25. The planar members 33 are so sized that when the arms 34 impinge on the top surface of elevator 25, the elevator is restrained against the upward pull of resilient means 27 thereby maintaining the elevator parallel to the horizontal plane of wings 13.

After maximum vertical flight has been attained and the propellant charges 21 and 22 have been exhausted, the elevator 25 must be deployed at its predetermined up-angle relative to the top horizontal plane of the wings 13 in order for the craft to attain a proper horizontal glide attitude. The manner in which the elevator is so deployed is shown in FIG. 3. As before mentioned, when propellant charges 21 and 22 are exhausted, the blow-out charge 23 is ignited. The gases generated upon ignition of blow-out charge 23 are propelled forwardly through tube 12. The forward travel of the gases are blocked by nose cone 16 and are directed into tube 11 via aperture 35. A bulkhead 36 disposed in tube 11 prevents forward movement of the gases, thus directing the gases rearwardly through tube 11. The gases impinge on the forward surface of flange 32 of plug 30, thus displacing plug 30 rearwardly resulting in disengagement of arms 34 from elevator 25. As the arms 34 disengage from elevator 25, tension in resilient means 27 is relaxed to the requisite extent and the elevator 25 is biased in the predetermined up angle position relative to the horizontal plane of wings 13. The plug 30 is prevented from further rearward movement by abutment of the after surface of flange 32 with retaining ring 37. The gases are exhausted from tube 11 via aperture 38.

The angle at which the elevator is biased relative to the wing is, of course, a function of the size, weight, wing loading and overall dimensions of the rocket-glider. The precise angle is determined empirically, in a manner well-known to the art, by test gliding the completed assembly and adjusting the elevator accordingly when the desired glide pattern is attained. To achieve proper balance, it may be necessary to add ballast at various points in the form of small weights, such as lead shot, lumps of clay or the like. Notwithstanding the size and weight of the craft, the elevator angle should not exceed about 22°, as too great an angle will result in stalling. After the proper angle has been determined, the resilient means 27 is adjusted so as to bias the elevator at said angle.

Figure 4:
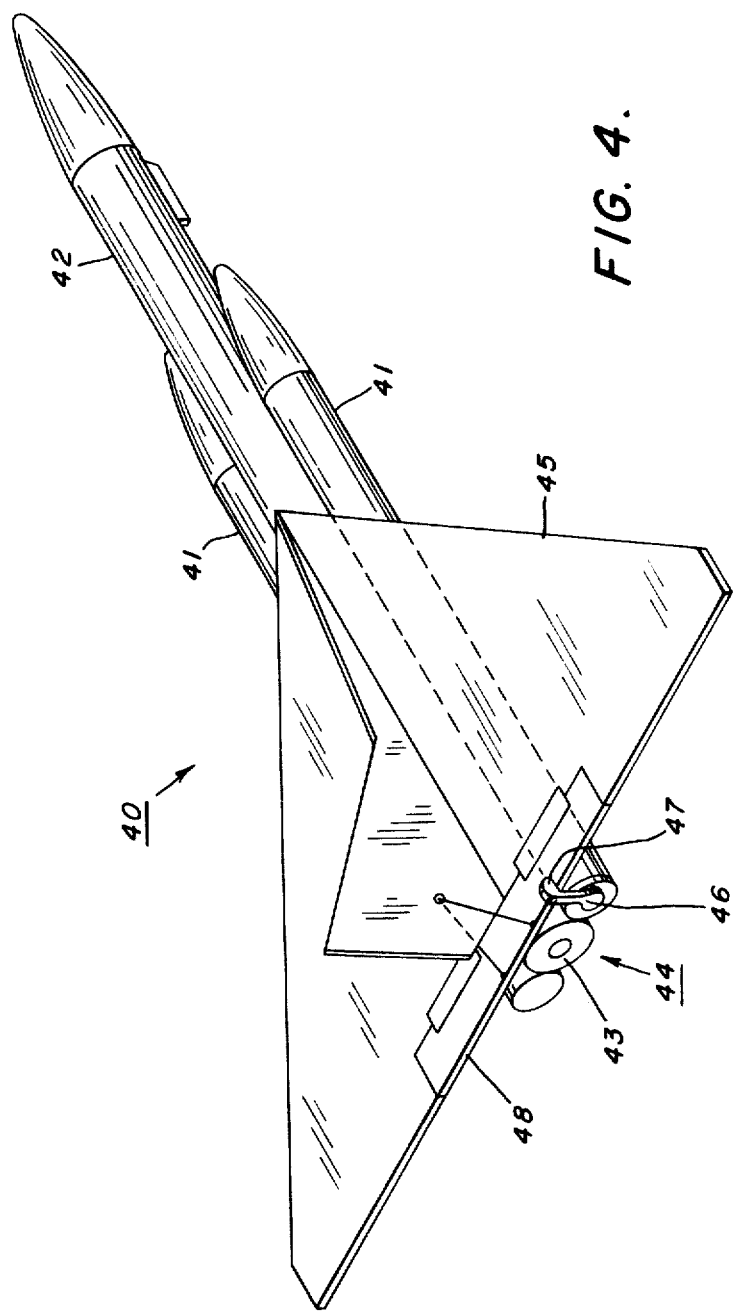
FIG. 4 is a rear perspective view of another embodiment of the model rocket-glider according to the invention.

FIG. 4 is illustrative of a variation of the above-described rocket-glider. The rocket-glider 40 has two auxiliary tubes 41 mounted beneath the wings 45 and on either side of the main body tube 42. The motor 43 is mounted in the after end of the main body tube 42 and the elevator retaining means 44 is mounted in one or the other of the auxiliary tubes 41, as shown, or in both auxiliary tubes (not shown). It will be further noted that only a single planar member 46 and associated arm 47 is used to retail the elevator 48 parallel to the horizontal plane of the wings 45. Otherwise, the mode of operation is identical to that described above, i.e. the gases generated upon ignition of the blow-out charge travel forwardly through tube 42 and are deflected rearwardly through tube 41 and urge the retaining means 44 rearwardly to disengage from elevator 48.

Figure 5:
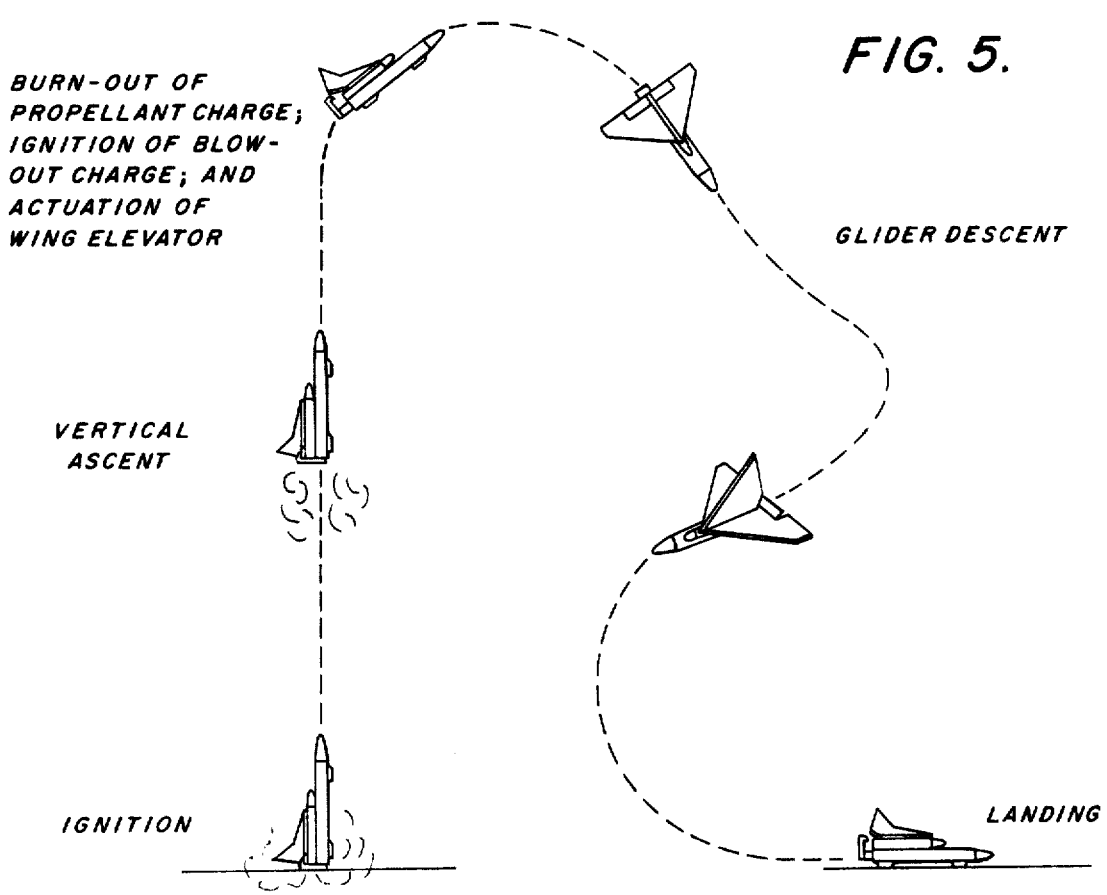
FIG. 5 is illustrative of the mode of operation of the model rocket-glider of the invention.

FIG. 5 is illustrative of the mode of operation of the rocket-glider of the invention. The rocket is positioned on a launch stand (not shown), and the motor is ignited by suitable means, such as an electric igniter (not shown). Upon ignition, the craft flies upwardly following a substantially vertical path. Following burn-out of the propellant charges, the blow-out charge ignites and the gases generated thereby disengage the retaining means from the elevator as described above. The elevator is actuated and the assembly glides back to earth. As shown in FIG. 1, landing skids 39 may be provided to prevent damage to the craft and to protect against scratches to any painted finish upon landing.

The rocket-glider described herein may be fabricated from any materials known to the scale modeling art, such as light-weight woods, plastic, cardboard or the like. It is to be further understood that the drawings and descriptions herein serve to illustrate the preferred embodiments of the invention and that many variations may be apparent to, and made therein, by those skilled in the art without departing from the spirit and scope of the invention.

What is claimed is:

1. A model rocket-glider assembly, for use with a solid fuel motor having a propellant charge and a blow-out charge, said assembly comprising:
   a. at least two tubes, said tubes being closed at their forward ends and open at their after ends, said tubes being secured parallel to their longitudinal axes, the interiors of at least two of said tubes being in open communication adjacent the forward portions thereof;
   b. wings affixed to at least one of said tubes, said wings having a hinged elevator formed in the trailing edge thereof;
   c. means for mounting the solid fuel motor in the after end of one of said tubes;
   d. means disposed in the after end of at least one of the other of said tubes for retaining said elevator parallel to the horizontal plane of the wings prior to ignition of said blow-out charge, said elevator retaining means arranged so as to disengage from said elevator upon the urging of gases generated upon ignition of said blow-out charge, the said gases being propagated forwardly through the tube in which the motor is mounted and rearwardly through the tube in which the elevator retaining means is disposed; and e. resilient means for biasing said elevator at a predetermined up-angle relative to the horizontal plane of the wings subsequent to disengagement of said elevator retaining means from the elevator.

2. The assembly of claim 1 wherein said elevator retaining means comprises a plug member slidably disposed in said tube, the after end of said plug member protruding from the tube, said after end of the plug having affixed thereto and extending upwardly therefrom a planar member, the upper end of said planar member terminating in a forwardly directed arm, said arm impinging on the top surface of the elevator thereby restraining the same against the upward pull of said resilient means.

3. The assembly of claim 2 wherein a pair of spaced, parallel upwardly extending planar members are affixed to the after end of the plug member, the upper end of each of said planar members terminating in a forwardly directed arm, each of which arms impinge on the top surface of the elevator.

4. The assembly of claim 2 wherein the plug member comprises a cylindrical body portion, the forward end of which terminates in an outwardly directed flange, the diameter of said flange being such as to frictionally engage the inner wall of the tube and assure a snug fit therein, but not so snug a fit as to prevent rearward displacement of the plug member within the tube under the urging of the gases generated upon ignition of the blow-out charge.

5. The assembly of claim 2 further including a retaining ring in the after end of the tube in which the elevator retaining means is disposed to limit the extent of rearward displacement of the plug member.

6. The assembly of claim 1 further including a vertical stabilizing fin mounted perpendicular to the top horizontal plane of the wings and parallel to the longitudinal axes of said tubes.

7. The assembly of claim 6 wherein the resilient means for biasing the elevator at a predetermined up-angle relative to the top horizontal plane of the wings comprises an elastic band which is passed through an aperture formed in the vertical stabilizing fin, the ends of said elastic band being secured to the elevator.

8. The assembly of claim 1 wherein the predetermined up-angle at which the elevator is biased does not exceed about 22°.

9. The assembly of claim 1 wherein the tube in which the elevator retaining means is disposed has an aperture formed in the after end thereof to exhaust the gases generated upon ignition of the blow-out charge.

10. The assembly of claim 1 wherein said tubes are in open communication via an aperture formed in each of said tubes.

11. The assembly of claim 10 further including a bulkhead disposed in the tube in which the elevator retaining means is disposed, said bulkhead located forwardly of the said aperture.

12. The assembly of claim 1 wherein the forward end of each of said tubes is closed by a nose cone.

* * * * *